United States Patent [19]  [11] 4,160,649
Ward  [45] Jul. 10, 1979

[54] SUBSTITUTED NATURAL GAS VIA STEAM REFORMING OF KEROSENE

[75] Inventor: Dennis J. Ward, South Barrington, Ill.

[73] Assignee: UOP Inc., Des Plaines, Ill.

[21] Appl. No.: 936,957

[22] Filed: Aug. 25, 1978

[51] Int. Cl.² .......................... C10G 11/28; C10K 3/06
[52] U.S. Cl. .................................. 48/214 A; 48/197 R; 48/213; 48/214 R; 260/449.6 M
[58] Field of Search ................ 48/214 A, 214 R, 211, 48/213, 197 R; 260/449.6 M, 449 M; 252/373

[56] References Cited

U.S. PATENT DOCUMENTS

| | | | |
|---|---|---|---|
| 3,744,981 | 7/1973 | Ward | 48/214 A |
| 3,771,261 | 11/1973 | Mandelik et al. | 48/197 R |
| 3,801,495 | 4/1974 | Gould | 48/197 R |
| 3,866,353 | 2/1975 | Krumm et al. | 48/214 A |
| 3,932,147 | 1/1976 | Okagami | 48/214 A |
| 4,010,008 | 3/1977 | Jo | 48/214 A |

Primary Examiner—Richard V. Fisher
Assistant Examiner—George C. Yeung
Attorney, Agent, or Firm—James R. Hoatson, Jr.; Robert W. Erickson; William H. Page, II

[57] ABSTRACT

A multiple-stage steam reforming process for producing a substitute natural gas from kerosene boiling range hydrocarbons. Initially, a lower-boiling feedstock is steam reformed and a portion of the effluent is subjected to hydrogen-producing conditions to provide a vaporous phase enriched in hydrogen content. This vaporous phase is utilized throughout the reaction zone circuit to decrease the extent to which carbon becomes deposited upon the various catalytic composites, and especially with respect to those reaction zones in which the kerosene boiling range hydrocarbons are processed. Gasification of the kerosene fractions is effected at a minimum catalyst temperature of about 840° F. (448.9° C.) and a maximum catalyst temperature of about 1,000° F. (537.8° C.).

10 Claims, No Drawings

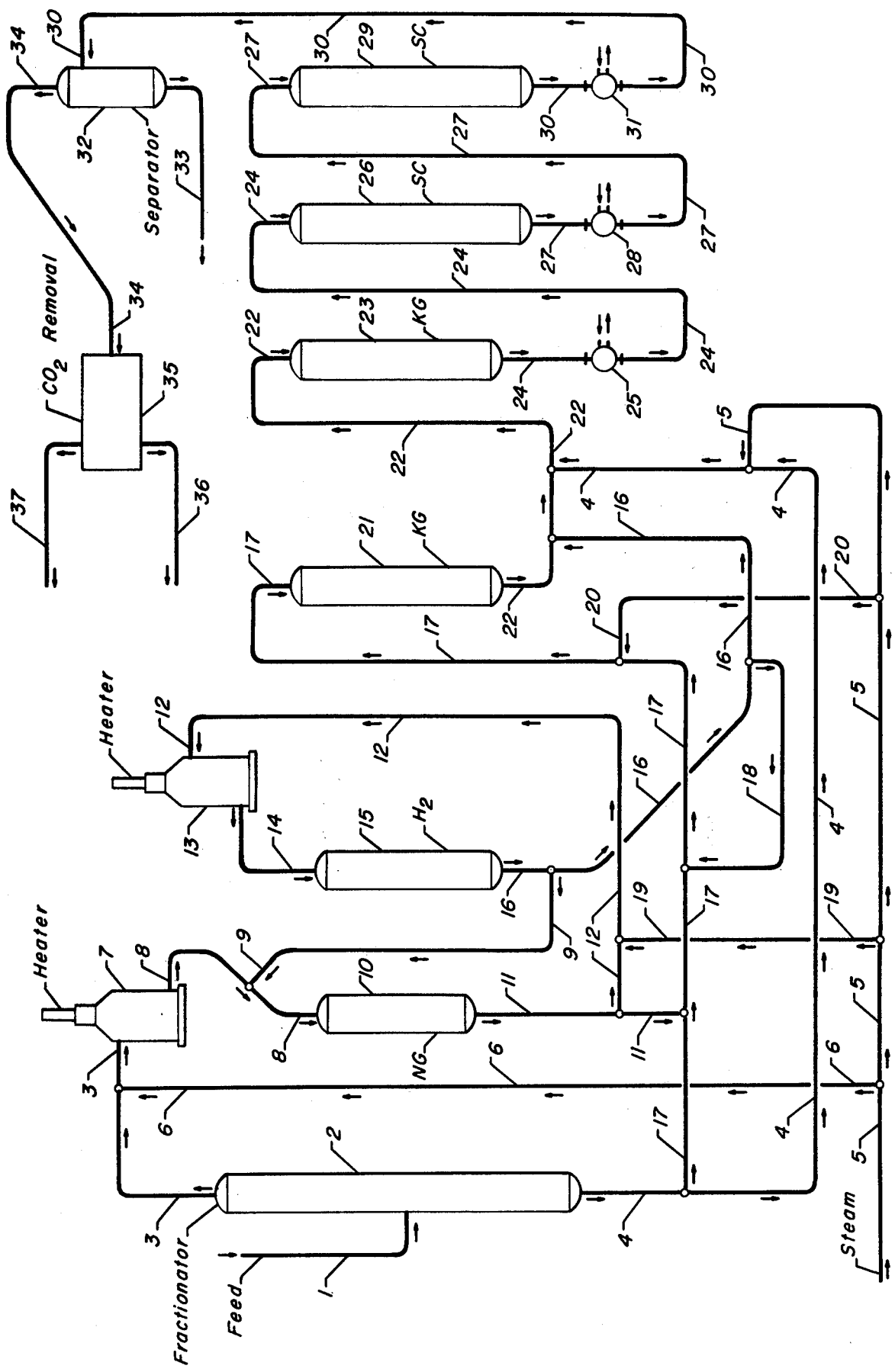

SUBSTITUTED NATURAL GAS VIA STEAM REFORMING OF KEROSENE

APPLICABILITY OF INVENTION

As herein described, the present invention directs itself toward hydrocarbon steam reforming for the production of a methane-rich gaseous product which is well suited for direct utilization as a substitute natural gas (SNG). More particularly, the present invention involves a technique which permits the use of kerosene boiling range hydrocarbons as the feedstock to the gasification reaction zone, or zones. Reforming of hydrocarbonaceous material, in the presence of steam, to produce lower boiling, normally gaseous products, is a process which has been available for a long time. At its inception, and for many years since, the process has been employed for the production of so-called "Town Gas". Such material differs from natural gas primarily in its composition and, therefore, in its heating value. It is lower in methane concentration, higher in hydrogen and carbon monoxide content and has a heating value approximating 500 to 600 BTU/cubic foot (4,450–5,340 kg-cal./M$^3$). Natural gas has a heating value which approaches that of pure methane, or about 1,010 BTU/cubic foot (8,900 kg-cal./M$^3$). Considering the necessary heating capacity and oxygen requirement of present-day appliances, an acceptable substitute natural gas must have a heating value of from about 900–1000 BTU/cubic foot (8,009–8,899 kg-cal./M$^3$).

Within about the last ten years, the demand for voluminous quantities of natural gas has experienced an accelerating rate principally as a result of two significant considerations. Great interest has been generated with respect to the violence being perpetrated upon the atmosphere due to the combustion of various other fuels. Consequently, there has been an increasing world-wide reluctance to the continued use of sulfur-contaminated coal and various fuel oils. Thus, greater demand and more reliance are being placed upon the use of methane-rich natural gas. Additionally, much concern is being expressed with respect to the continued availability of our energy-bearing resources other than natural gas. These are inclusive of crude oil, coal and shale, as well as the lower boiling constituents which are derived therefrom—e.g. motor fuel, jet fuel, etc.

According to those having the requisite expertise, maintaining the present rate of natural gas usage, although recognizing that the rate is steadily increasing, will result in closely approaching virtually total depletion of natural gas reserves within a period approximating 10 to 15 years. In an attempt to alleviate this intolerable adverse situation, more and more petroleum refiners and gas producers have turned to the relatively ancient technology of hydrocarbon steam reforming. This has given rise to many innovations, most of which have centered around improved catalytic composites and processing techniques designed to afford an extended period of operation while producing maximum quantities of substitute natural gas from a given quantity of charge stock, and with lower energy costs. It is to this end that the various objects and embodiments of my invention are particularly directed.

A perusal of the prior art directed toward hydrocarbon steam reforming will indicate that as the average molecular weight, or carbon number of the feedstock increases, the degree of difficulty in achieving the desired end result increases. Among other aspects, the severity of operating conditions in the gasification zones is at a higher level, the weight ratio of steam to hydrocarbon feed increases and the rate of carbon deposition upon the catalytic composites increases. The latter affects both stability and activity of the catalyst. Stated differently, normally vaporous hydrocarbons, ethane, propane and the butanes are relatively easily converted into methane.

In addition to normally vaporous material, current substitute natural gas processes favor gasoline, or naphtha boiling range charge stocks. These are generally divided into two categories: light naphthas which may contain pentanes and have an end boiling point in the range of about 250° F. (121.1° C.) to about 300° F. (148.9° C.); and, heavy naphthas having an initial boiling point of about 250° F. (121.1° C.) to about 300° F. (148.9° C.) and an end boiling point of about 400° F. (204.4° C.) to about 450° F. (232° C.). The end boiling point of the heavy naphtha fraction, as indicated in the prior art, actually overlaps what many experts consider to be the kerosene boiling range of about 350° F. (176.7° C.) to about 550° F. (287.8° C.). However, the prior art processes are ill-equipped to handle these heavier feeds; the present process is intended to be applied to the gasification (conversion to methane) of kerosene boiling range feedstocks.

OBJECTS AND EMBODIMENTS

A principal object of the process encompassed by my inventive concept is the conversion of kerosene fractions into methane-rich SNG. Corollary to this objective is the intent to extend the period of time during which the catalytic composites maintain their stability and activity, and the process functions acceptably and economically.

A specific object of my invention is to provide a processing technique which decreases the extent to which carbon becomes deposited on the catalyst when effecting the steam reforming of kerosene boiling range fractions.

Therefore, in a broad embodiment, my inventive concept encompasses a multiple-stage process for producing a methane-rich substitute natural gas from a kerosene charge stock, containing hydrocarbons boiling above a temperature of 450° F. (232.2° C.), which comprises the sequential steps of: (a) reacting a hydrocarbon boiling below the kerosene boiling range and steam, in a first catalytic reaction zone, at steam reforming conditions including a temperature in the range of about 800° F. (426.7° C.) to about 1,025° F. (551.7° C.); (b) reacting a first portion of the resulting first zone effluent, in a second catalytic reaction zone, at hydrogen-producing conditions including a temperature in the range of about 1,200° F. (648.9° C.) to about 1,600° F. (871.1° C.); (c) recycling at least a portion of the resulting second zone effluent to said first reaction zone; (d) reacting a second portion of said first zone effluent and a first portion of said kerosene charge stock, in a third catalytic reaction zone, at steam reforming conditions including (i) a minimum catalyst bed inlet temperature of about 840° F. (448.9° C.) and, (ii) a maximum catalyst bed outlet temperature of about 1,000° F. (537.8° C.); (e) reacting at least a portion of the resulting third reaction zone effluent and a second portion of said kerosene charge stock, in a fourth catalytic reaction zone, at steam reforming conditions including (i) a minimum catalyst bed temperature of about 840° F. (448.9° C.) and, (ii) a maximum catalyst bed outlet temperature of about 1,000° F. (537.8° C.); and, (f) recovering said methane-rich substitute natural gas from the resulting fourth reaction zone product effluent.

In another embodiment, a portion of the hydrogen enriched second reaction zone effluent is introduced into said third reaction zone.

Other objects and embodiments of the present invention will become evident from the following additional description of the process. In one such other embodiment, fresh steam is introduced into at least one of said second, third and fourth catalytic reaction zones.

CITATION OF RELEVANT PRIOR ART

Candor compels recognition and acknowledgement of the fact that the prior art is replete with a wide variety of publications which are directed toward processes for the steam reforming of hydrocarbons and hydrocarbon fractions. A perusal of Class 48, and particularly Sub-Class 214, indicates that such is the case. Any attempt herein to exhaustively delineate the steam reforming art would constitute an exercise in futility. However, it is believed that a brief description of several U.S. Patents, copies of which accompany this application, will suffice to indicate the state of the art and serve to define the area to which the present invention is principally directed.

In U.S. Pat. No. 4,010,008 (Cl. 48-214), issued to Jo on Mar. 1, 1977, a multiple-stage process is described. Two stages of hydrocarbon gasification (conversion of feedstock to methane, hydrogen and carbon oxides) and two stages of methanation (shift conversion to produce additional methane from hydrogen and carbon monoxide) are employed. With respect to the gasification section, a portion of the first stage effluent is cooled and condensed, and introduced into a separation zone. At least about 90.0% of the water is removed, and the portion is recycled to the first gasification stage. Gasification effluent, from the last of the series-flow reaction zones, constitutes the charge to the two-stage methanation section. Water and carbon dioxide are removed from the effluent emanating from the first shift converter prior to effecting additional methanation in the second shift converter. This technique is commonly referred to in the art as "wet-dry" methanation.

Although the discussion of suitable feedstocks appears to encompass kerosene boiling range charge stocks—the heavy naphtha is stated as having an end boiling point in the range of 400° F. (204.4° C.) to about 450° F. (232.2° C.)—the process will not tolerate kerosene fractions for an acceptable extended period of time. Although the hydrogen concentration in the portion of the first gasification effluent is increased from about 10.3% to about 16.9% (Column 6, Lines 36–39), by virtue of the fact that at least 90.0% of the steam has been removed, the quantity of hydrogen in the stream being recycled to the first gasification zone has decreased about 6.0% (Column 8, Table III).

A multiple-stage process for methane production from feedstocks having different average molecular weights is described in U.S. Pat. No. 3,932,147 (Cl. 48-214), issued to Okagami et al on Jan. 13, 1976. The feedstock having the comparatively lower average molecular weight—e.g. butanes—is reacted with steam in the first gasification reaction zone. Product effluent therefrom is admixed with the feedstock having the relatively higher average molecular weight—e.g. a light naphtha fraction—and the mixture introduced into the second gasification reaction zone. The use of two normally liquid fractions is described in an illustrative example (Column 2, Line 31 through Column 7, Line 35). Disclosed is a light fraction having an initial boiling point of 37° C. (98.6° F.) and an end boiling point of 119° C. (246.2° F.) which is reacted in the first gasification reaction zone. The heavier fraction, having an initial boiling point of 143° C. (289.4° F.) and an end boiling point of 238° C. (460.4° F.), is admixed with the product effluent from the first gasification zone (about 10.5% by volume hydrogen) and introduced into the second gasification zone.

There exists no recognition of the benefits afforded where a portion of the first zone effluent is subjected to a hydrogen-producing reaction system and recycled to the first gasification reaction zone increased in hydrogen concentration. From a technical viewpoint, the effects of the process are not substantially different from any other substitute natural gas unit in which the fresh feed is split between the two gasification reactors and the effluent from the first reactor is admixed with the second portion of the feed. Thus, while Okagami et al have applied the useful principal of splitting the feed into light and heavy fractions, the process is limited by the molecular weight of the feed without employing excessive quantities of steam in the first reaction zone. This is due to the temperature limitations of the gasification catalysts employed. By employing a catalyst suitable for a higher temperature range, I can achieve higher hydrogen contents for the gasification reactions without the necessity for excessive steam. This technique expands the range of hydrocarbons capable of being processed with acceptable catalyst lives.

In my U.S. Pat. No. 3,744,981 (Cl. 48-214), issued July 10, 1973, I describe the technique of subjecting at least a portion of the gasification reaction zone effluent to hydrogen-producing conditions and recycling the hydrogen-enriched effluent to combine with the fresh feed charge stock. The suitable charge stocks I have discussed (Column 2, Lines 33–44) have a maximum end boiling point of about 450° F. (232.2° C.). This technique is utilized in the present process as briefly outlined herebelow.

In accordance with the present invention, the gasification effluent which is subjected to hydrogen-producing is derived from a hydrocarbon mixture which boils below the kerosene boiling range. By way of definition and clarification, "kerosene boiling range", as used herein, connotes hydrocarbons boiling above 400° F. (204.4° C.) and below about 575° F. (301.7° C.). Normally liquid hydrocarbons boiling below 400° F. (204.4° C.) are herein referred to as gasoline, or naphtha fractions.

SUMMARY OF INVENTION

The charge stock to the present process may be either a mixture of kerosene boiling range hydrocarbons with lower-boiling hydrocarbons, or a substantially pure kerosene fraction containing only an insignificant amount of lower-boiling hydrocarbons. In either case, the fresh feed will contain a substantial amount of hydrocarbons boiling between about 450° F. (232.2° C.) and 575° F. (301.7° C.). Where the kerosene fraction contains gasoline, or naphtha boiling range hydrocarbons, the fresh feed charge stock will be separated in a suitable fractionation facility to provide a light fraction containing hydrocarbons boiling below 400° F. (204.4° C.) and the heavier kerosene fraction. The light fraction is initially processed in a first gasification reaction zone, in admixture with steam. When the fresh feed charge stock contains an insignificant quantity of material boiling below 400° F. (204.4° C.), an external source for the light fraction is utilized. Preferably, the lighter-than-kerosene material will consist of the normally vaporous hydrocarbons, ethane, propane and butanes. Regardless of the source, it is understood that the hydrogen-enriched recycle stream is obtained solely from product effluent resulting from the gasification of a hydrocarbon mixture boiling below the kerosene boiling range, or 400° F. (204.4° C.).

It is possible to utilize a single reaction zone for the gasification of the light fraction; however, depending upon the rate at which the kerosene fraction is charged, it may be necessary to process a greater quantity of the lighter fraction in more than one gasification reaction zone. With large capacity units, multiple reaction zones, in series flow, with divided hydrocarbon feed facilitate operation control and prolong the effective life of the catalytic composites. The naphtha gasification reaction zone will generally function at catalyst bed temperatures ranging from about 800° F. (426.7° C.) to about 1025° F. (551.7° C.); that is, the catalyst bed inlet temperature will be about 800° F. (426.7° C.) to about 950° F. (510° C.), while the outlet temperature will be about 850° F. (454.4° C.) to about 1,025° F. (551.7° C.). Steam reforming of the light fraction will be effected at pressures in the range of about 100 psig. (7.81 atm.) to about 1,500 psig. (103.11 atm.), and preferably from about 300 psig. (21.42 atm.) to about 1,000 psig. (69.07 atm.). In SNG processes, the quantity of steam charged to the unit is generally expressed as a weight ratio with respect to the quantity of the hydrocarbonaceous material charged; suitable steam/hydrocarbon weight ratios will be in the range of about 1.0:1.0 to about 6.0:1.0. Since the hydrocarbons charged to a given reaction zone are 100% converted, and, by comparison, an insignificant amount of steam disappears, it is convenient to compute the steam/hydrocarbon ratio in terms of the total weight of steam to the total weight of hydrocarbons for the overall process. All of the fresh steam may be introduced into the first gasification zone, or the same may be split into varying quantities, each of which is introduced into a separate gasification reaction zone. The present process also provides for the introduction of fresh steam into the hydrogen-producing reaction zone.

A wide variety of catalytic composites suitable for use in steam reforming processes are well known, and have been thoroughly described in the prior art. In general, these catalysts utilize metallic components selected from Group VI-B and the iron-group of the Periodic Table, including chromium, molybdenum, tungsten, iron, cobalt and nickel. Also thoroughly disclosed in the prior art are the benefits which accrue through the use of catalytic promoters which are selected from alkali and alkaline-earth metals including lithium, sodium, potassium, rubidium, beryllium, magnesium, calcium and strontium. Such components are generally combined with a suitable refractory inorganic oxide carrier material, either synthetically-prepared, or naturally-occurring. Common refractory inorganic oxide material includes kieselguhr, kaolin, attapulgus clay, alumina, silica, boria, hafnia, zirconia, etc., and mixtures thereof. A particularly suitable and preferred steam reforming catalyst is described in U.S. Pat. No. 3,429,680 (Cl. 48-214). This catalyst employs a carrier material of kieselguhr and a catalytically active nickel component promoted through the use of a copper-chromium, or copper-chromium-manganese complex, and which may be additionally promoted with an alkali, or alkaline-earth metal component. It is understood that the present invention does not depend upon the use of any particular catalyst for its viability. The catalytic composites employed in the hydrogen-producing reaction zone, the kerosene gasification zones and the shift methanation zones are generally selected from those hereinabove described.

The product effluent from the first gasification system consists of methane, carbon monoxide, carbon dioxide, steam and hydrogen. On a wet basis, the hydrogen content will be about 8.0 mol.% to about 12.0 mol.%; on a dry basis, this increases to about 15.2 mol.% to about 22.7 mol.%. In accordance with the present invention, at least a portion of this effluent, from about 10.0% to about 100.0%, is diverted, without steam removal, to a hydrogen-producing zone which functions at substantially the same pressure, but at an elevated temperature in the range of about 1200° F. (648.9° C.) to about 1600° F. (871.1° C.). In a preferred mode of operation, the catalyst bed inlet temperature is in the range of about 1300° F. (704.4° C.) to about 1500° F. (815.6° C.), and the catalyst bed outlet temperature ranges from about 1,350° F. (732.2° C.) to about 1600° F. (871.1° C.). It is within the scope of the present invention to admix additional fresh steam with the feed to the hydrogen-producing zone.

As above stated, the catalytic composite in the hydrogen-producing zone may be of the same general character as the catalyst employed in the gasification zone. Preferably, however, the catalyst contains an iron-group metal component combined with an alumina/silica carrier material. At the elevated level of operating severity (principally increased temperature), hydrogen-producing reactions are effected with the result that the hydrogen concentration increases to about 16.0 mol.% to about 36.0 mol.%, on a wet basis. This hydrogen enriched vaporous phase is then recycled to combine with the light fraction charge to the first gasification reaction zone. It is within the scope of the present invention to introduce portions of the hydrogen enriched vaporous material into each of the gasification reaction zones into which the kerosene charge stock is introduced.

Preferably, the kerosene boiling range feed stream is divided into as many portions as the number of kerosene gasification reaction zones. While not essential to the present process, the kerosene feed may generally be split into equal portions. The multiple gasification reaction zones function in series-flow, with the gasification effluent from a preceding zone being admixed with the fresh feed portion to the next succeeding reaction zone. Similarly, a portion of fresh steam may be introduced into each of the kerosene gasification reaction zones. Kerosene gasification will be effected at substantially the same pressure imposed upon the first gasification zone and the hydrogen-producing zone, and utilizing catalytic composites of the type hereinbefore described. Temperatures at which the kerosene feedstock is gasified are of a critical nature. Catalyst bed inlet temperatures must be at least about 842° F. (450° C.), and the catalyst bed outlet temperatures should not exceed 995° F. (535° C.). Temperatures within these limits are such that the maximum allowable temperature differential (exothermic temperature increase) is about 50° F. (28° C.) to about 100° F. (56° C.).

Gasification product effluent is cooled to a temperature in the range of about 450° F. (232.2° C.) to about 800° F. (426.7° C.) and introduced into the methanation, or shift converter section. This section also makes use of multiple reaction zones, generally two, in series. Hydrogen is caused to react with carbon monoxide and carbon dioxide to produce additional quantities of methane and water. Carbon dioxide and water must necessarily be removed to the extent that the product gas achieves pipeline quality. As hereinbefore stated, the removal of these components may be effected in any suitable fashion. For example, in U.S. Pat. No. 3,744,981, the water and carbon dioxide are removed after the second methanation stage, whereas, in U.S. Pat. No. 4,010,008, water and carbon dioxide are removed after the first stage methanation; additional water is removed following the second stage methanation. Water removal is effected by cooling and condensing the effluent stream to a temperature in the range of about 600° F. (15.6° C.) to about 140° F. (60° C.), and introducing the same into a suitable vapor/liquid separator. Removal of carbon dioxide follows the removal of water and may be carried out in any well-known manner available in the prior art. One such conventional manner involves mono-ethanolamine adsorption. Another adsorption technique utilizes hot potassium carbonate, while still another technique employs a catalytic reaction system which utilizes vanadium pentoxide as the catalyst.

BRIEF DESCRIPTION OF DRAWING

Further description of the methane-rich gas process encompassed by my inventive concept will be made with reference to the accompanying drawing which is illustrative of several embodiments. The process is depicted by way of a simplified schematic flow diagram in which such details as pumps, instrumentation and controls, heat-exchange and heat-recovery circuits, start-up lines, compressors, valving, etc., have been reduced in number, or eliminated as being non-essential to a clear understanding of the techniques involved. Utilization of these and other mescellaneous appurtenances, to modify the process as illustrated, is well within the purview of one possessing the requisite skill in the appropriate art, and the use thereof will not depart from the spirit of my invention, the scope of which is defined by the appended claims.

In describing the drawing, it will be presumed that the fresh feed charge stock comprises about 20.0 volume percent naphtha boiling range hydrocarbons, about 30.0% of material boiling from about 400° F. (204.4° C.) to about 450° F. (232.2° C.), the remainder boiling up to about 575° F. (301.7° C.). Illustrated are six catalytic reaction zones 10, 15, 21, 23, 26 and 29. Naphtha is gasified in NG reactor 10, hydrogen is produced in $H_2$ reactor 15, the kerosene is gasified in KG reactors 21 and 23, and methanation is effected in shift converters (SC reactors) 26 and 29.

DETAILED DESCRIPTION OF DRAWING

With specific reference now to the drawing, the charge stock, having an initial boiling point of about 350° F. (176.7° C.) and an end boiling point of about 570° F. (298.9° C.) is introduced into the process via conduit 1. As derived from a full boiling range crude column, the selected fraction is contaminated by the inclusion of nitrogenous and sulfurous compounds. Therefore, prior to being employed as the charge to the present process, the same will be subjected to a hydrorefining technique to convert these catalyst-contaminating influences into hydrogen sulfide, ammonia and hydrocarbons. Hydrorefining processes and techniques proliferate in the prior art, and the selection of any particular scheme to prepare a substantially sulfur and nitrogen-free feedstock is not essential to my invention; therefore, there exists no necessity herein for a detailed description thereof. Suffice to state that the feed stream separated in fractionation facility 2 contains only trace quantities of contaminants.

Naphtha boiling range components, having normal boiling points up to about 400° F. (204.4° C.) are recovered as an overhead light fraction in line 3; the heavier kerosene fraction is withdrawn as bottoms material in conduit 4. Steam enters the process, by way of conduit 5, in an amount such that the weight ratio of total steam to total hydrocarbon is about 2.5:1.0. The present process provides for diverting a portion of the steam to each of the four reaction zones 10, 15, 21 and 23 by way of lines 6, 19, 20 and 5 (into conduit 4), respectively. The naphtha fraction in line 3 is admixed with a first portion of fresh steam in line 6, the mixture continuing through line 3 into direct-fired heater 7, wherein the temperature is increased to a level required to attain the desired temperature at the inlet to the catalyst bed in NG reactor 10. The heated steam and hydrocarbon mixture in line 8 is admixed with a hydrogen-enriched vaporous phase from line 9, the mixture continuing through line 8 into NG reactor 10. The catalytic composite disposed within NG reactor 10 comprises a carrier material of kieselguhr, about 38.0% by weight of a nickel component (calculated as the element), about 9.0% by weight of magnesium oxide and about 7.5% by weight of a copper-chromium-manganese component in which the copper to chromium to manganese mole ratio is 1.0:1.0:1.0.

NG reactor 10 functions at a pressure of about 380 psig. (26.87 atm.) and a catalyst bed inlet temperature of about 925° F. (496.1° C.). Gasified product effluent is withdrawn through conduit 11 at a temperature of about 975° F. (523.9° C.) and a pressure of about 370 psig. (26.19 atm.). About 60.0%, based upon the fresh naphtha feed, is diverted through line 12 to serve as the feed to $H_2$ reactor 15. Fresh or additional steam from line 19 is admixed with the diverted portion, the mixture continuing through line 12 into direct-fired heater 13. The heated mixture passes through line 14 into $H_2$ reactor 15 at a pressure of about 360 psig. (25.51 atm.) and a temperature of about 1500° F. (815.6° C.). In this particular illustration, $H_2$ reactor 15 has disposed therein a high temperature tolerant catalytic composite of about 15.0% by weight of iron (calculated as the elemental metal) combined with a composite of 63.0% by weight of alumina and 37.0% by weight of silica. The hydrogen-enriched effluent is recovered in conduit 16 and a first portion diverted through line 9 as aforesaid.

Approximately 50.0% by volume of the kerosene fraction in line 4 is diverted through line 17; this portion is admixed with the remainder of the gasified effluent from NG reactor 10 (from line 11), a second portion of the effluent from $H_2$ reactor 15 (from line 18) and a portion of fresh or additional steam (from line 20). The mixture continues through line 17 and is introduced thereby into KG reactor 21 at a pressure of about 340 psig. (24.14 atm.) and a temperature of about 850° F. (454.4° C.). KG reactor 21 contains a catalytic composite having the same physical and chemical characteristics as the catalyst previously described in regard to NG reactor 10. Gasified kerosene effluent is recovered in line 22 at a temperature of about 925° F. (496.1° C.), and admixed with the remaining portion of the hydrogen-enriched effluent in line 16 and the second portion of the kerosene feed from line 4, containing the remainder of the fresh or additional steam from line 5. The mixture continues through line 22 and is introduced thereby into the second KG reactor 23 at a temperature of 850° F. (454.4° C.) and a pressure of about 320 psig. (22.78 atm.). In one specific embodiment of this invention a draw stream 22a may be withdrawn to a place of use from line 22 at any point between KG reactor 21 and KG reactor 23. In this manner only a portion of the third reaction zone effluent need be passed to the fourth catalytic reaction zone KG 23. The catalytic composite disposed in KG reactor 23 is identical to that disposed in KG reactor 21.

The gasified product effluent from KG reactor 23 is recovered in line 24 at a temperature of about 925° F. (496.1° C.) and a pressure of about 310 psig. (22.1 atm.), and is introduced thereby into a cooler 25 wherein the temperature is lowered to a level of about 530° F. (276.7° C.) and introduced into a first shift converter, or methanation zone, SC reactor 26 at a pressure of about 300 psig. (21.42 atm.). Shift converter reactors 26 and 29 contain a catalyst substantially identical to that which is disposed in NG reactor 10. Product effluent from SC reactor 26 is recovered in line 27 at a temperature of about 680° F. (360.0° C.) and a pressure of about 295 psig. (21.08 atm.). Passing through cooler 28, the temperature is lowered to a level of about 520° F. (271.1° C.) and the thus-cooled material continues through conduit 27 into a second SC reactor 29 at a pressure of about 290 psig. (20.74 atm.). Additional methane is produced by reaction between carbon oxides and hydrogen, and the product effluent is withdrawn via line 30 at a pressure of about 285 psig. (20.4 atm.) and a temperature of about 540° F. (282.2° C.). Cooler/condenser 31 lowers the temperature to a level of about 100° F. (37.8° C.), and the condensed effluent is passed through line 30 into water separator 32. The effluent from SC reactor 29, now substantially free from water, passes by way of conduit 34 into carbon dioxide removal system 35. Carbon dioxide is withdrawn through line 36, while the methane-rich product gas is recovered via line 37. The latter consists of about 97.8 mol.% methane, 1.0% carbon dioxide, trace (0.002%) carbon monoxide, 1.1% hydrogen and 0.1% water, and has a heating value of about 977 BTU/cu.ft. (8,694.3 kg-cal./M$^3$).

I claim as my invention:

1. A multiple-stage, steam reforming process for producing a methane-rich substitute natural gas from a kerosene charge stock, containing hydrocarbons boiling above a temperature of 450° F., which comprises the sequential steps of:

(a) reacting a hydrocarbon mixture boiling below the kerosene boiling range and steam, in a first catalytic reaction zone, a steam reforming conditions including a temperature in the range of about 800° F. to about 1025° F.;

(b) reacting a first portion of the resulting first zone effluent, in a second catalytic reaction zone, at hydrogen-producing conditions including a temperature in the range of about 1200° F. to about 1600° F.;

(c) recycling at least a portion of the resulting second zone effluent to said first reaction zone;

(d) reacting a second portion of said first zone effluent and a first portion of said kerosene charge stock, in a third catalytic reaction zone, at steam reforming conditions including (i) a minimum catalyst bed inlet temperature of about 840° F. and, (ii) a maximum catalyst bed outlet temperature of about 1,000° F.;

(e) reacting at least a portion of the resulting third zone effluent and a second portion of said kerosene charge stock, in a fourth catalytic reaction zone, at steam reforming conditions including (i) a minimum catalyst bed inlet temperature of about 840° F. and, (ii) a maximum catalyst bed outlet temperature of about 1000° F.; and, (f) recovering said methane-rich substitute natural gas from the resulting fourth reaction zone product effluent.

2. The process of claim 1 further characterized in that the other portion of said second reaction zone effluent is introduced into said third reaction zone.

3. The process of claim 1 further characterized in that the other portion of said second reaction zone effluent is introduced into said fourth reaction zone.

4. The process of claim 1 further characterized in that additional steam is introduced into said second reaction zone.

5. The process of claim 1 further characterized in that additional steam is introduced into said third reaction zone.

6. The process of claim 1 further characterized in that additional steam is introduced into said fourth reaction zone.

7. The process of claim 1 further characterized in that at least a portion of said fourth zone effluent is reacted in a fifth catalytic reaction system at methanation conditions including a maximum catalyst bed temperature in the range of about 450° F. to about 800° F.

8. The process of claim 1 further characterized in that said hydrocarbon mixture is normally vaporous and contains hydrocarbons having from two to four carbon atoms per molecule.

9. The process of claim 1 further characterized in that said hydrocarbon mixture is a normally liquid light naphtha fraction having an end boiling point below about 300° F.

10. The process of claim 1 further characterized in that said hydrocarbon mixture is a normally liquid heavy naphtha fraction having an initial boiling point above about 250° F. but below 400° F.

* * * * *